(12) United States Patent
Summe et al.

(10) Patent No.: US 6,523,873 B1
(45) Date of Patent: Feb. 25, 2003

(54) TAPER AND FLARE ENERGY ABSORPTION SYSTEM

(75) Inventors: Todd L. Summe, Pittsburgh, PA (US); Jieh-Ren Yeh, Pittsburgh, PA (US); Eric M. Stull, Delmont, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/932,673

(22) Filed: Aug. 17, 2001

(51) Int. Cl.[7] ................................................ B60R 19/34
(52) U.S. Cl. ...................... 293/133; 293/102; 293/132; 296/189
(58) Field of Search ................................ 293/102, 132, 293/133; 296/188, 189

(56) References Cited

U.S. PATENT DOCUMENTS

| | | | | |
|---|---|---|---|---|
| 3,134,585 A | * | 5/1964 | Trask | 293/133 |
| 3,412,628 A | * | 11/1968 | De Gain | 293/133 |
| 3,437,367 A | * | 4/1969 | Blank | 293/133 |
| 3,495,474 A | * | 2/1970 | Nishimura et al. | 293/133 |
| 3,511,345 A | * | 5/1970 | Takamatsu et al. | 293/133 |
| 3,599,757 A | * | 8/1971 | Takamatsu et al. | 293/133 |
| 3,724,833 A | * | 4/1973 | Sergay | 293/133 |
| 3,747,915 A | * | 7/1973 | Hall | 293/133 |
| 3,887,223 A | * | 6/1975 | Bez | 293/133 |
| 4,023,652 A | * | 5/1977 | Torke | 293/133 |
| 4,181,198 A | * | 1/1980 | Lindberg | 293/133 |
| 4,190,276 A | * | 2/1980 | Hirano et al. | 293/133 |
| 4,336,868 A | * | 6/1982 | Wilson et al. | 293/133 |
| 5,090,755 A | * | 2/1992 | Garnweidner | 293/133 |
| 5,403,049 A | * | 4/1995 | Ebbinghaus | 293/133 |
| 5,732,801 A | * | 3/1998 | Gertz | 293/133 |
| 6,189,941 B1 | * | 2/2001 | Nohr | 293/135 |
| 6,231,095 B1 | | 5/2001 | Chou et al. | 293/133 |

FOREIGN PATENT DOCUMENTS

DE 4316164 A1 * 11/1994 ................ 293/133

OTHER PUBLICATIONS

Kroger, M., et al., "Comparison of the Energy Absorption by Tapering of Tubes with Other Forming Processes", Universitat Hannover Germany, date unknown.

* cited by examiner

Primary Examiner—D. Glenn Dayoan
Assistant Examiner—Lori L. Coletta
(74) Attorney, Agent, or Firm—Charles H. Dougherty, Jr.; Gary P. Topolosky; Thomas R. Trempus

(57) ABSTRACT

An energy absorption system and method comprised of a crush tube, a taper component, and a flare component. The crush tube is inserted into a matching hole in the taper component. As the taper and flare components are moved down over the crush tube, the taper component decreases the diameter of the crush tube and the flare component splits the crush tube in a plurality of petals. The crush tube may include a plurality of initiator slits to aid in the flaring process. When mounted with the longitudinal axis of the crush tube parallel to an axis of an impact, the present invention is capable of absorbing some or all of the crash event by dissipating energy by the tapering, flaring, friction, and other methods.

20 Claims, 3 Drawing Sheets

TAPER AND FLARE ENERGY ABSORPTION SYSTEM

BACKGROUND OF THE INVENTION

1. Field of the Invention

The present invention relates to systems and methods for crash energy management and, more specifically, relates to systems and methods for energy absorption in automotive applications utilizing a taper and flare energy absorption system.

2. Description of the Background

The design for crashworthiness is an extremely important aspect of vehicle and structural design. The primary aspect of crashworthiness design is providing a means to dissipate kinetic energy through the work of deformation within the vehicle structure. In the current energy absorption design systems, such as axially collapsed or inverted crush tubes, highly ductile material is critically important due to the severe strain states experienced during the deformation. Also, the amount of energy absorption is very sensitive to the quality and controls of the material. The available materials that meet these requirements, especially for non-ferrous metals, may be limited, and the resulting product cost may be significantly increased.

A typical prior art application may utilize an axial folding collapse technique, wherein a pre-dented hollow tube 100 is crushed lengthwise into a regular pattern 110 (see, FIG. 1). These triangular or other-shaped dents (not shown) force the crush tube to collapse into the "natural mode" which can then produce expected results. Typically, these prior art crush tubes 100 are made of aluminum alloys, but many other materials are also used. Some conventional crush tube assemblies may not contain any dents.

These conventional crush tubes are typically installed behind the front bumper section of an automobile or truck. The tube is affixed at one end to a rail on the chassis of the automobile and at the other end to the bumper. Hence, the force of a resulting collision that is perpendicular to the front face of the bumper will cause an axial compressive force on the installed crush tube, causing it to collapse. These tubes may also be installed in the rear bumper of automobiles or in any other orientation or system in which a spatially-confined absorption of an abrupt axial load is desired.

The conventional crush tube applications may suffer from one or more drawbacks that prevent their controlled use in many applications. For example, because of the intense crushing action, the tube must be made of a ductile metal, such as a special aluminum alloy. Such highly ductile metals are typically more expensive than less ductile materials. If materials with lower ductility are used, they may crack or split and therefore lose some or all of their energy absorption capacity.

Also, as seen in FIG. 1, the "crush zone" 110 into which the tube 100 is compacted does not extend throughout the entire length of the crush tube 100. Hence, the uncrushed portions of the crush tube 100 are wasted in terms of energy absorption. Testing has shown that the conventional crush tube application may crush only approximately 70%–75% of the length of the crush tube.

Because of the intense and structured way in which the conventional application is crushed in a natural mode pattern, these crush tubes are typically made pursuant to very tight tolerances. Even small variations in the thickness of the material of the crush tube may cause a large variation in energy absorption during a crash event. For example, a weakness in one area of the tube may cause the tube to buckle in that area with a result that the tube does not perform as designed and may not absorb the requisite amount of energy for its intended application.

Even during normal operation, these conventional crush tube applications are not ideal. For example, the force dissipated by the "collapsing" process oscillates around the mean force dissipation of the system. Therefore, high peaks of force are created by the conventional methods. These peak loads may cause a "jerking" sensation to the passengers of the vehicle and may require that the backup structure be reinforced, thereby increasing the peak loads when crushing the backup structure. This may reduce passenger safety.

Also, because the existing technologies typically utilize only about 70% of the original crush tube length for energy absorption, high loads are needed to absorb the required energy in a given space. Therefore, in the case of automobiles, the accelerations imparted to the passengers are correspondingly high which may also adversely affect passenger safety.

These various limitations to the current implementation of axially loaded crush tube absorption systems are preferably addressed by one or more embodiments of the present invention.

SUMMARY OF THE INVENTION

In accordance with the present invention, there is provided an energy absorption system and method generally comprised of a crush tube, a taper component, and a flare component. The crush tube is inserted into a matching hole in the taper component. As the taper and flare components are moved over the crush tube, the taper component decreases the diameter of the crush tube and the flare component splits the crush tube into a plurality of petals. When mounted with the longitudinal axis of the crush tube parallel to an axis of an impact, the present invention is capable of absorbing some or all of the crash event by dissipating energy by the tapering, flaring, friction, and other methods.

The crush tube may include a plurality of initiator slits to aid in the flaring process, and the crush tube may have a circular, oval, square, rectangular, hexagonal, or other cross-sectional profile. The taper and flare components are preferably adapted to accept one or more of these crush tube orientations.

The present invention may utilize materials that are not acceptable for use with conventional axial crush absorption systems. For example, a material with less ductility may be used.

In at least one presently preferred embodiment, the invention is installed in a car, truck or other vehicle to partially or wholly absorb the shock of a crash event. For example, the energy absorption system may be mounted between a rail on the chassis or frame of the car and a bumper. Because the present absorption system generally dissipates energy along a single impact axis, two or more of the present absorption systems may be installed in a plurality of locations and orientations in a vehicle to absorb crash shocks from various impact angles and locations. The present invention may also be used in other axial load applications such as trains, barriers, elevators, carriers, and the like.

These and other features and advantages of the present invention will become readily apparent to persons skilled in the art from the following detailed description of the invention, the abstract, and the attached claims.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the invention, a discussion of such elements is not provided herein. The detailed description will be provided hereinbelow with reference to the attached drawings.

In at least one presently preferred embodiment of the invention, there is provided an energy absorption system comprising a taper component, a flare component, and a crush tube component. An axial load is initially absorbed by the crush tube as it is compressed by the taper component and thereafter as it is split apart by the flare component. The taper component and flare component may be combined into a single "taper and flare component." The present invention preferably combines the advantages of tapering and flaring of crush tubes into a single energy absorption system.

Figure 1:
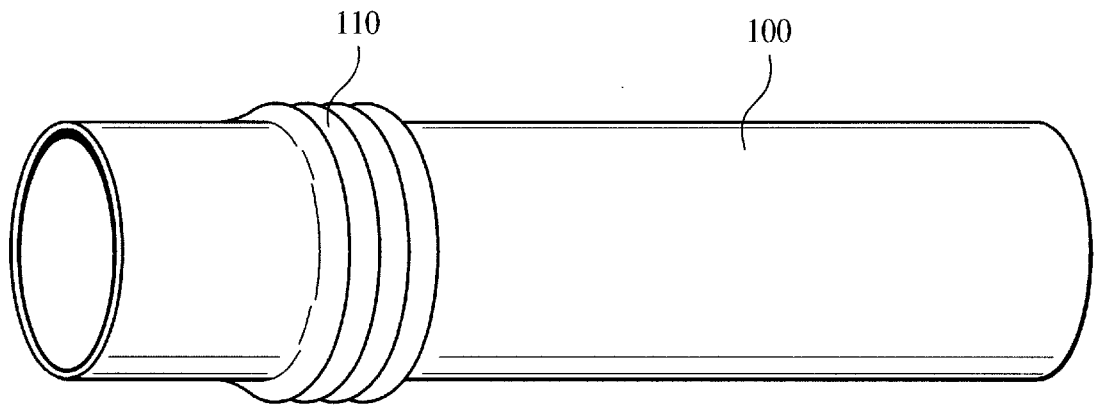
FIG. 1 shows a conventional crush tube after partial deformation.
Figure 2:
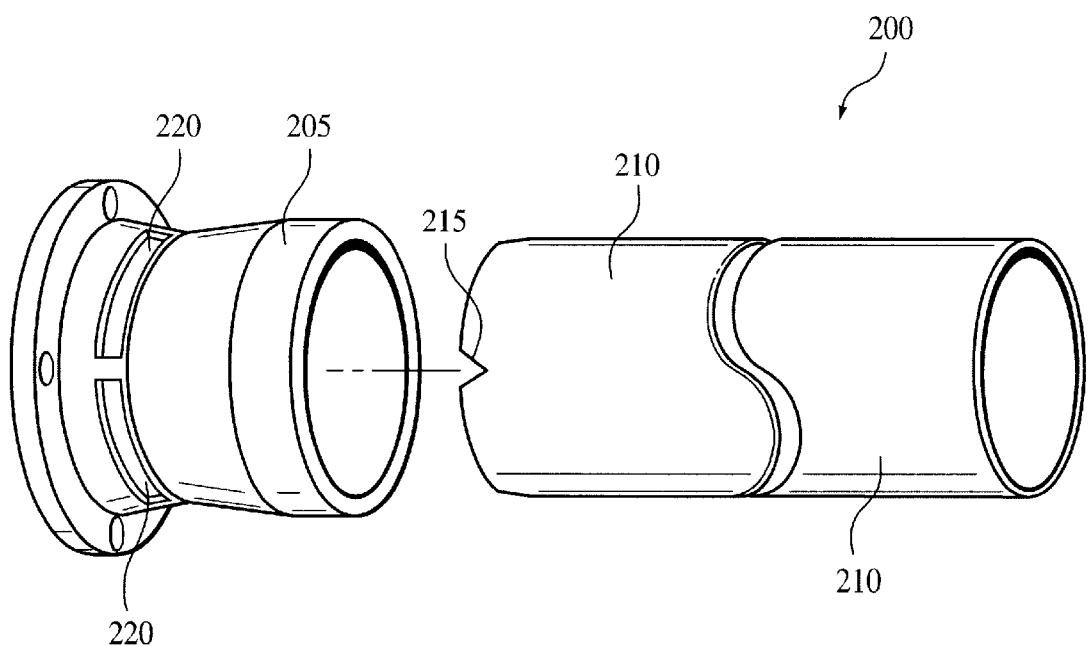
FIG. 2 details one presently preferred embodiment of an energy absorption assembly.

FIG. 2 details one presently preferred embodiment of an energy absorption assembly 200 according to the present invention. In FIG. 2, a cast, machined or fabricated taper and flare component 205 is oriented to accept the end of a crush tube 210 which is shown broken because it is generally longer than that shown in FIG. 2. The crush tube 210 is depicted as a circular profile cylinder, but the tube may be made in other orientations and profile shapes as described below. When an impacting body imparts an axial load (a load parallel to the longitudinal axis of the crush tube 210) on the taper and flare assembly 200 (i.e., a "crash event"), the taper and flare component 205 slides over the crush tube 210 and tapers the tube (compresses the radial diameter of the tube).

As the taper and flare component 205 continues down the crush tube 210 because of a continuous or additional axial load, the tapered portion of the tube becomes split ("flared") into multiple pieces ("petals"). The taper and flare component 205 continues to move down the crush tube 210 until all of the energy from the crash event is absorbed or until the end of the crush tube 210 is reached.

Figure 3:
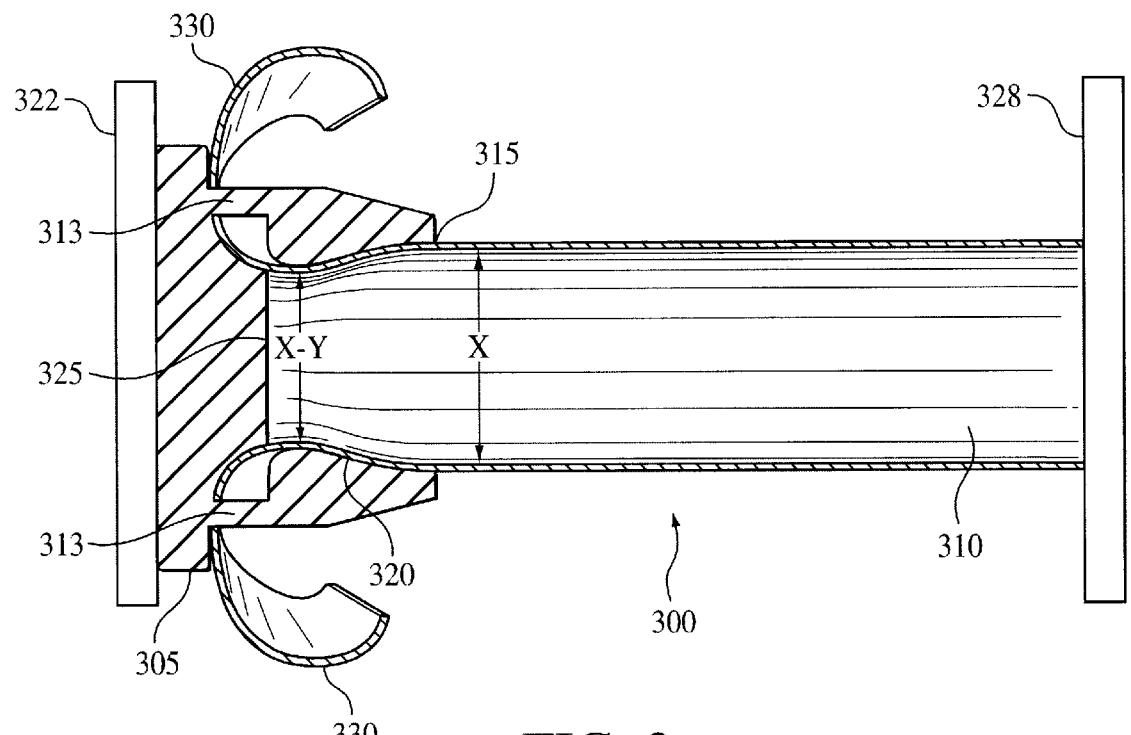
FIG. 3 shows a sectional view of a taper and flare energy absorption system.

More specifically, FIG. 3 shows a sectional view of a preferred taper and flare assembly 300 cut parallel to the longitudinal axis of the crush tube 310. The crush tube 310 enters the taper and flare component 305 through an opening 315, which is preferably just slightly larger than the profile of the crush tube 310. As the taper and flare component 305 is forced down over the crush tube 310 (or similarly as the crush tube is forced up into the taper and flare component), the crush tube enters the "tapering" section 320 of the taper and flare component 305 which is generally a gradual decrease in the size of the profile of the crush tube 310.

For example, if the crush tube 310 was a circular profile cylinder with a diameter of X millimeters, the taper and flare opening 315 may be a circular opening with a diameter of just greater than X millimeters, and the taper component 320 may gradually reduce this diameter to approximately X–Y millimeters. This tapering absorbs energy through the deformation of the crush tube (described in greater detail below).

As shown in FIG. 2, the crush tube 210 is preferably initiated with small slots 215 (shown as triangles in FIG. 2) placed at various locations around the end of the tube 210 that enters the taper and flare component 205. Forcing the split end of the crush tube 210 onto the "cone" 325 (FIG. 3) of the flaring component causes the tube to split into separate segments or "petals" 330. These petals 330 then flare out away from the central axis of the crush tube 310. In other words, as the taper and flare component 305 continues to be forced down over the crush tube 310, the "tapered" and split part of the tube will begin to flare into a number of pieces 330 (dictated by the number of initiators 215 cut into the tube). Preferably, no other guidance of the flares 330 is necessary, but a guide slot 220 or other guiding mechanism may be used in certain applications to better control the properties of the flared crush tube.

For purposes of clarification, the small segments 313 shown between the taper and flare components correspond to the small amount of material between adjacent guide slots 220. If the FIG. 3 cross section is rotated slightly along the longitudinal axis (so that the cross section is taken through the guide slots 220), these segments 313 would not be present. The taper and flare components are shown as one piece 305 in FIG. 3, but these components may also be manufactured as two or more separate pieces that are then bolted or otherwise attached together.

Preferred measurements for the initiator slots 215 may be approximately 6 millimeters deep and 2 millimeters wide each. As the taper and flare component 305 continues to push down over the crush tube 310 and the flaring continues, the flared petals 330 will generally fold back over themselves ("curl") as the natural (unguided) mode of deformation. The guide slots 220 in the flare portion of the taper and flare component 305 may provide merely a window or hole for the flared petals 330 to curl, but the petals may be directed in any fashion to increase the resulting friction (and therefore the resulting energy dissipation). The radial compression of the tube 310 due to the taper component preferably keeps the "split" from passing down into the non-tapered portion of the crush tube and causing a failure or reduced energy absorption in the system.

Figure 4:
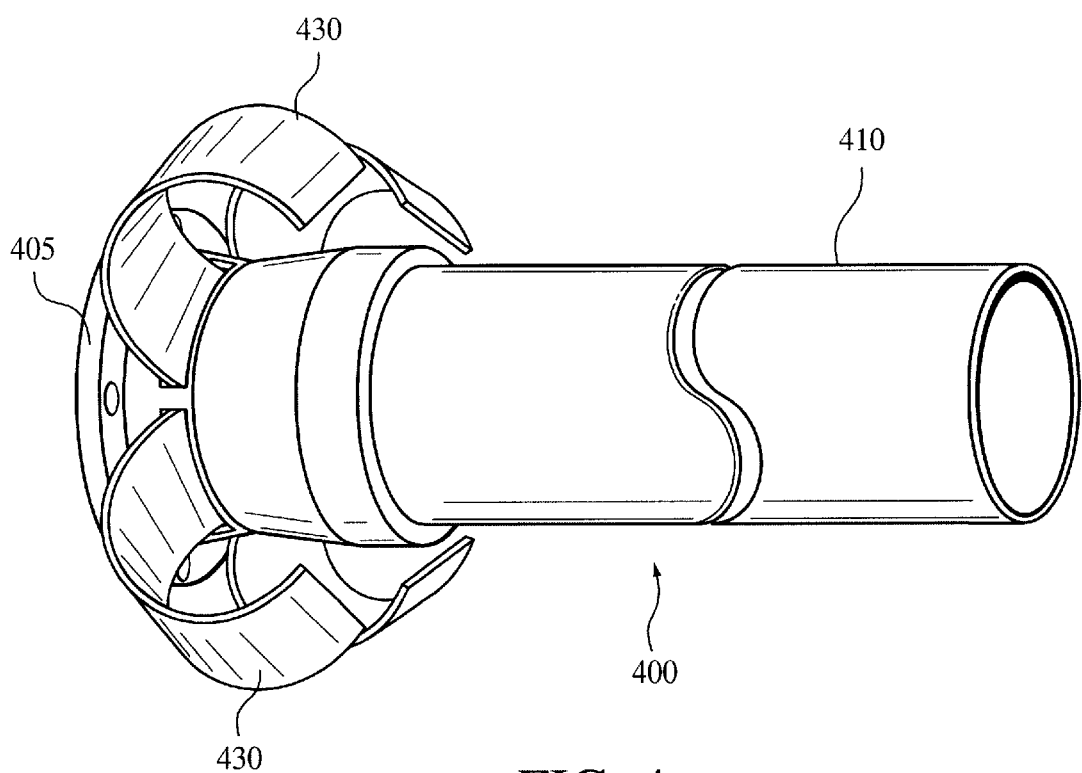
FIG. 4 shows a perspective view of a taper and flare energy absorption system after a crash event.

FIG. 4 shows a perspective view of one embodiment of a taper and flare energy absorption system 400 after a crash event. The taper and flare component 405 has been forced down over the majority of the crush tube 410, and the various petals 430 (in this case four) can be seen curled back over the taper and flare assembly. From the outside of the assembly, the free end of the crush tube and the resulting tapered and flared "ends" 430 of the crush tube can be seen. The energy dissipated by the system includes, among other sources, all of the energy used to deform the cylinder between these two states (from tube 410 to split petals 430).

From a more technical point of view, the taper and flare energy absorption system of the present invention is preferably able to dissipate the energy from a crash event in a variety of different manners. For example, during the tapering process, the largest amount of energy is absorbed due to the reduction in the crush tube's diameter. The amount of energy dissipated in the taper is generally based on the decrease in the diameter of the tube during compression and the plastic flow stress of the tube material. The resulting crush tube will generally have a reduced diameter, an increased thickness, and a decreased length.

Additionally, the flaring of the crush tube into multiple petals generally dissipates work by way of friction and metal fracture or tearing. There is friction involved as the tube is forced over the flaring apparatus. Energy is also dissipated by the tearing of the material.

The present invention preferably allows the use of a much higher percentage of the original length of the crush tube for energy absorption, relative to conventional axial compression technology. Testing has shown that the length utilization may be approximately 90% instead of 70% for the existing technologies described above. Given a specified space, for example between a vehicle bumper and the frame, the present invention preferably provides equal energy absorption with lower peak loads and therefore provides better safety to the passengers in the vehicle. In addition to the higher safety potential, this invention allows the use of materials that have a much lower ductility than those required for the conventional technologies. Therefore, the cost of the present system may be decreased, and the reliability of the present system may be increased.

Figure 5:
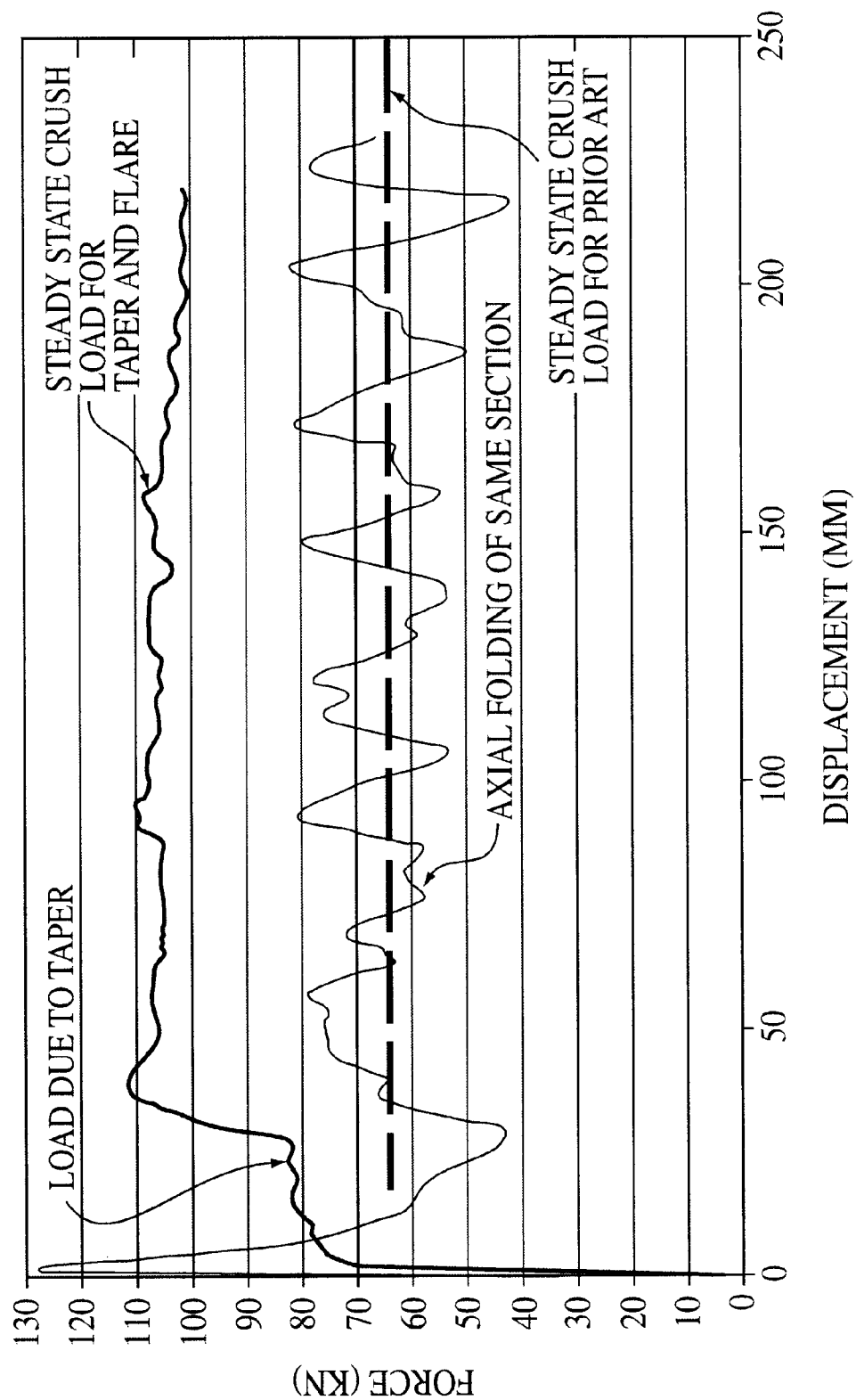
FIG. 5 shows a graph of the crush load versus crush distance for an exemplary embodiment of the present invention and a conventional axial collapsing crush tube.

FIG. 5 shows a graph of the energy absorption (the crush load) versus crush distance in a taper and flare energy absorption system according to the present invention as compared to the conventional axial collapsing energy absorption system. FIG. 5 shows that the displacement of the crush tube through the taper assembly is generally linearly related to the force applied to the tube down its longitudinal axis. At the point where the compressed end of the tube leaves the taper apparatus, the crush tube displacement will proceed at an approximately steady level of force (steady state). Since the assembly process preferably accounts for the initial portion of the load curve which is due to tapering only, the crush load experienced in an impact is initially approximately equal to the steady state crush load. Therefore, high energy absorption efficiency is achieved with lower peak load requirements in the crush rail and supporting structure. This results in improved passenger safety due to reduced peak decelerations.

The highest point on the FIG. 5 curves is the peak load of the energy absorption systems. Because it takes a greater initial load to begin the crushing of the conventional system, the conventional system has a greater peak load than the present invention. In the FIG. 5 example, the peak load for the crush tube and backup structure of the present invention is shown to be approximately 15% less than the conventional assembly. These lower peak loads preferably result in an automobile passenger "feeling" less deceleration during a crash event, thereby increasing passenger safety at lower vehicle speeds.

The steady state crush load for the present invention is also significantly higher than that of the conventional energy absorption systems. As seen in FIG. 5, after the "pre-loading" of the taper component of the present invention (described more fully below), the systems reach a steady state crush load throughout much of the length of the crush tube. The conventional assembly has comparatively wide oscillations with a mean steady state crush load that is approximately 35–50% lower than the present invention. Therefore, the present invention may be capable of absorbing more energy per unit of displacement than the prior art. A higher total crush load absorption may be further amplified because a greater percentage of the length of the crush tube may be utilized with the present invention when compared to conventional systems.

The prior art systems' ability to absorb loads is typically based on the materials used, the geometry of the tubes, and the thickness of the tubes. Preferably, the present invention may be used with a wider variety of materials. Specifically, the present invention may be used with the 6000 series aluminum alloys, such as 6260 and 6063-T6 temper. Many of these alloys are commonly available and are among the cheapest metal alloys of this type available. The present invention may also be used with steel. The taper or the taper and flare components both may be made of steel, aluminum, magnesium or other materials.

In one preferred embodiment of the present invention, the taper and flare energy absorption assembly is installed behind the bumper of a vehicle. Specifically, the crush tube and taper and flare component are welded or otherwise affixed between a rail of the vehicle chassis 322 and the bumper of the vehicle 328 (see, FIG. 3). The taper and flare component(s) may be oriented immediately behind the bumper 328 or between the crush rail and backup structure (the interior of the vehicle frame). A "pre-loading" step of installation for the taper and flare system involves inserting the end of the crush tube into the taper component to the point just before flaring. In the vehicle, the crush tube is preferably sub-assembled to the taper component by simply pushing the tube into the taper. This pre-insertion increases the energy capacity of the system (see, FIG. 5).

In typical energy absorption systems, material fracture is an undesirable event, but with the present concept, the fracture is limited to the free end of the tube because the compressive stress field created by the taper component does not allow the fracture to propagate past the taper. The taper component provides the structural connection between the tube and the rest of the structure. Therefore, the structural integrity is maintained throughout the crash event.

Although the examples of the present disclosure have involved the use of a hollow circular crush tube, it is also possible to utilize other crush tube profiles such as oval, square, rectangular, hexagonal, octagonal, etc. The taper and flare component may be adapted to accept these various crush tube profiles. Specifically, different taper and flare components may be designed with different openings to accept different crush tube profiles. These "alternative crush tubes" may also utilize common aluminum alloys like air quenched 6063-T6 and 6060-T6 for primary energy absorbing members or materials other than aluminum. The taper and flare system has the potential to allow the use of more common alloys, which may therefore improve the cost and supply base issues.

In addition to the alloy-related issues, the existing energy absorption technology typically utilizes 70–75% of the original member length for energy absorption. Therefore, due to the increased average crush load capability and crush length efficiency, the present taper and flare concept has the potential to significantly improve vehicle crashworthiness by absorbing more energy with less intrusion into passenger compartments.

In the design concepts that utilize castings for the taper and flare component, it is estimated that Advanced Green Sand Casting (AGSC) or permanent mold castings will be best suited due to the size, thickness and alloys available. Also, since the joints connecting the taper, flare and crush tube are preferably mechanical joints, it may be feasible to use any combination of the design and materials of each component (e.g., a steel tube and steel flare may be used with a cast taper) This added flexibility is not generally available in the conventional energy absorption system because of the design constraints described above.

An exemplary taper and flare component length may be approximately 400 mm. The fracture initiators in the end of the crush tube may be made by simple saw cuts approximately 6 mm deep and as wide as the saw blade. In a preferred embodiment, the number of initiators is four, however, a greater or lesser number of initiators may be used for various applications and design requirements. An isometric view of the exemplary initiators is shown in FIG. 2.

The number of initiator slits may be adapted over a wide range of values. Generally speaking, an increase in the number of slits will increase the stability of the system during a crash event. However, an increased number of slits may also decrease the amount of energy that may be absorbed by the system. Hence, depending on the desired performance of the taper and flare energy absorption system in accordance with the present invention, the number, size and orientation of the slits may be altered.

The present invention may be adaptable in a variety of others ways. For example, due to the coefficient of static friction between the tube and the taper component, significant surface galling may occur on the taper and flare assembly which causes the crush load to increase as the crash event progresses. This may cause the tube to eventually collapse in an axial folding mode. However, the surface galling may be eliminated by applying a common hard anodize coating to the crush tube and taper and flare components. It should be noted that the coating may affect the coefficient of friction thus changing the crush loads. Although the anodize coating may not be preferred, it demonstrates design alterations that may not be feasible in the prior art which depends more on material consistency and uniformity.

Because of the high efficiency of the energy absorption system of the present invention, the taper and flare system may preferably be used in other applications in addition to the conventional front bumper orientation. For example, the present invention may be used behind the instrument panels or in other confined areas of the vehicle. Because of the adjustability and high value of energy absorption, the present invention may be used in higher inertial applications such as in trains or in elevators as emergency braking apparatuses. The present invention may also be less sensitive to tolerances in manufacture than conventional applications.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. An energy absorption assembly, comprising:
    a crush tube;
    a taper component with an opening on a first end adapted to accept said crush tube; and
    a flare component attached to a second end of said taper component.

2. The energy absorption assembly of claim 1, wherein said taper component and said flare component are manufactured as one single component.

3. The energy absorption assembly of claim 1, wherein said crush tube comprises a plurality of initiator slits in one end.

4. The energy absorption assembly of claim 3, wherein said plurality of initiator slits is four slits.

5. The energy absorption assembly of claim 3, wherein each of said plurality of initiator slits is approximately 6 mm deep and 1 mm wide.

6. The energy absorption assembly of claim 1, wherein said taper component, said flare component, and said crush tube have an anodized coating thereon.

7. The energy absorption assembly of claim 1, wherein said crush tube comprises a tube with a cross-sectional profile selected from the group consisting of a circle, a square, an oval, a rectangle, a hexagon, and a combination thereof.

8. The energy absorption assembly of claim 1, wherein said taper component and said flare component are approximately 70 mm in length combined.

9. The energy absorption assembly of claim 1, further comprising:
    a vehicle bumper; and
    a vehicle chassis rail, wherein the crush tube, taper component, and flare component are mounted between said bumper and said chassis rail.

10. The energy absorption assembly of claim 1, wherein said flare component includes a plurality of slots to allow a flared portion of said crush tube to exit the energy absorption system.

11. The energy absorption assembly of claim 10, wherein said plurality of slots is four.

12. The energy absorption assembly of claim 1, wherein said taper component, said flare component and said crush tube are made of an aluminum alloy.

13. The energy absorption assembly of claim 1, wherein said flare component and said taper component are two separate pieces.

14. The energy absorption assembly of claim 13, wherein said taper component and said flare component are made of two different materials.

15. A taper and flare device, comprising:
    a hollow taper and flare housing;
    a crush tube receiving profile at a first end of the hollow housing adapted to receive a crush tube;
    a crush tube exit profile including a plurality of slots adapted to allow flared ends of a crush tube to exit the hollow housing; and
    a tapered inner wall between said crush tube receiving profile and said crush tube exit profile adapted to compress the crush tube in the radial direction.

16. The device of claim 15, further comprising:
a hollow crush tube at least partially inserted into said crush tube receiving profile.

17. The device of claim 16, wherein the inner profile of the crush tube receiving profile and the outer profile of the crush tube are approximately equivalent.

18. The device of claim 16 wherein said crush tube includes a plurality of initiator slits.

19. A method of absorbing energy in a single direction, said method comprising the steps of:
providing a crush tube, a taper component, and a flare component;
inserting one end of said crush tube into said flare component; and
orienting said crush tube, said taper component, and said flare component such that the taper component reduces the diameter of the crush tube and the flare component allows fragmented sections of the crush tube to leave the flare component when the crush tube is displaced parallel to the longitudinal axis of the crush tube in a direction towards the taper and flare components.

20. The method of claim 19 wherein said step of inserting the crush tube into the taper component occurs prior to a step in which the crush tube, taper component, and flare component are installed between a vehicle bumper and a vehicle chassis.

* * * * *